(12) United States Patent
Harada et al.

(10) Patent No.: US 6,636,257 B1
(45) Date of Patent: Oct. 21, 2003

(54) MOBILE BODY RECOGNIZING APPARATUS AND MOTOR VEHICLE MONITORING APPARATUS

(75) Inventors: Ichiro Harada, Tochigi-ken (JP); Naoya Ohta, Maebashi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/430,746

(22) Filed: Aug. 6, 1999

(30) Foreign Application Priority Data

Aug. 11, 1998 (JP) .......................................... 10-227362
Nov. 9, 1998 (JP) .......................................... 10-318179

(51) Int. Cl.⁷ ............................ H04N 7/18; H04N 9/47
(52) U.S. Cl. ...................... 348/148; 348/113; 348/119; 348/118; 382/103; 382/104; 382/106
(58) Field of Search ................................. 348/113, 118, 348/119, 148; 382/103, 104, 106; 340/937, 933; 364/424.01, 424.033; 356/3.16; 701/23

(56) References Cited

U.S. PATENT DOCUMENTS

| | | | | |
|---|---|---|---|---|
| 4,249,207 A | * | 2/1981 | Harman et al. | 358/108 |
| 5,166,681 A | * | 11/1992 | Bottesch | 340/933 |
| 5,559,695 A | * | 9/1996 | Daily | 364/424.01 |
| 5,684,697 A | * | 11/1997 | Mullen | 364/424.03 |
| 5,805,275 A | * | 9/1998 | Taylor | 356/3.16 |
| 6,138,062 A | * | 10/2000 | Usami | 701/23 |

* cited by examiner

*Primary Examiner*—Chris Kelley
*Assistant Examiner*—Charles Parsons
(74) *Attorney, Agent, or Firm*—Carrier, Blackman & Associates, P.C.; Joseph P. Carrier; William D. Blackman

(57) ABSTRACT

A given visual field is divided into a plurality of areas, and brightness information in the areas is detected at predetermined time intervals and stored as information of a mobile body in a memory of a motor vehicle monitoring apparatus on a motor vehicle. The bright information detected in the areas at different times is then read from the memory, and a motion of the brightness information between adjacent ones of the areas is detected as a one-dimensional optical flow. The detected one-dimensional optical flow is compared with a one-dimensional optical flow generated from a road due to the speed of the motor vehicle, for thereby detecting another motor vehicle which is moving toward the motor vehicle.

18 Claims, 8 Drawing Sheets

MOBILE BODY RECOGNIZING APPARATUS AND MOTOR VEHICLE MONITORING APPARATUS

BACKGROUND OF THE INVENTION

1. Field of the Invention

The present invention relates to a mobile body recognizing apparatus and a motor vehicle monitoring apparatus for detecting, with an image sensor such as an imaging device or the like mounted on a motor vehicle such as an automobile, information of another motor vehicle that approaches the motor vehicle from behind or laterally, as brightness information, calculating motion of the other approaching motor vehicle based on the detected information, and issuing a warning to the driver of the motor vehicle if the other approaching motor vehicle is predicted to pose a danger.

2. Description of the Related Art

The rapid advances in car electronics in recent years have created various computer-controlled technologies for assisting in safe driving of motor vehicles such as automobiles. The developed computer-controlled safety schemes include a system wherein road signs, nearby objects, and other motor vehicles are imaged by a CCD sensor, and the image signal from the CCD sensor is processed to recognize motion of those other motor vehicles.

It is assumed, for example, that a motor vehicle is approached by another motor vehicle from behind the motor vehicle, the driver of which tends to overlook objects behind the motor vehicle. If the driver makes a left or right turn or changes lanes without paying much attention to the other approaching motor vehicle, then the approaching motor vehicle has to be braked in order to avoid an imminent danger and hence is prevented from running smoothly. It is highly useful and advantageous from the standpoint of smooth traffic control to equip a motor vehicle with a function to be able to recognize another approaching motor vehicle.

Such a technology for recognizing motion of a mobile body is expected to be developed for use with various mobile bodies in general, including airplanes and ships as well as automobiles. The technology itself constitutes an important technical field that is believed to find a wide variety of applications in the future.

One conventional process of detecting the existence of a motor vehicle that is approaching another motor vehicle from behind and enabling the driver of the latter motor vehicle to recognize the detected approaching motor vehicle is disclosed in Japanese laid-open patent publication No. 7-50769, for example.

According to the disclosed process, an imaging device such as a video camera, a CCD (Charge-Coupled Device) camera, or the like mounted on a rear portion of a motor vehicle captures rear and side scenery image information, and a processor determines the level of a danger created by an approaching motor vehicle which attempts to pass the motor vehicle or is running in an adjacent lane, based on the captured image information, and issues a warning to the driver of the motor vehicle. Specifically, the processor detects, as an optical flow vector, motion of a point on an object in the images of two chronologically successive frames among a series of rear and side scenery images captured by the imaging device, and determines the level of a danger from the magnitude and direction of the optical flow vector.

In the above process, a window is established in radial directions from an FOE (Focus of Expansion) in a previous image, and moved in the same directions in a subsequent image. The centers of preset positions in the previous and subsequent images in the window are interconnected by an arrow, which is defined as an optical flow vector for a point in question. The speed and direction of a following motor vehicle in the images are determined from the magnitude and direction of the optical flow vector.

According to the above process of detecting a motor vehicle, it is necessary to recognize an image through image processing from image information obtained by an imaging device for thereby identifying a motor vehicle that follows a motor vehicle carrying the imaging device, and then to calculate an optical flow of the following motor vehicle in the image information of two chronologically successive frames.

Generally, identifying a certain motor vehicle, e.g., a following motor vehicle, from image information obtained by an imaging device requires a high image processing capability, and a processor for carrying out such image processing needs to be able to process a large amount of image information in a short period of time. Particularly, a high-speed processor capable of instantaneously processing a large amount of data needs to be installed on an automobile to perform a function to recognize, in advance, the existence of another automobile approaching from behind in an attempt to pass the automobile and then give a suitable warning to the driver of the automobile. Image processing software that is run by the above high-speed processor is required to have a highly sophisticated image processing algorithm, with the result that the high-speed processor is necessarily highly expensive to manufacture.

Even if the information obtained to recognize a following approaching motor vehicle is held to a minimum required amount in order to eliminate the above drawbacks, the processor needs to be able to detect the following approaching motor vehicle with good accuracy.

SUMMARY OF THE INVENTION

It is therefore an object of the present invention to provide a mobile body recognizing apparatus which is capable of reliably recognizing a mobile body such as a motor vehicle, for example.

Another object of the present invention is to provide a mobile body recognizing apparatus which is capable of holding information obtained from a mobile body to a minimum required amount and determining the status of the mobile body by effectively using the minimum required amount of information.

Still another object of the present invention is to provide a motor vehicle monitoring apparatus which is capable of holding information obtained from another motor vehicle that is approaching a motor vehicle to a minimum required amount and highly accurately determining the status of the other motor vehicle by effectively using the minimum required amount of information.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Preferred embodiments of a mobile body recognizing apparatus and a motor vehicle monitoring apparatus according to the present invention will be described in detail below with reference to the accompanying drawings.

Figure 1:
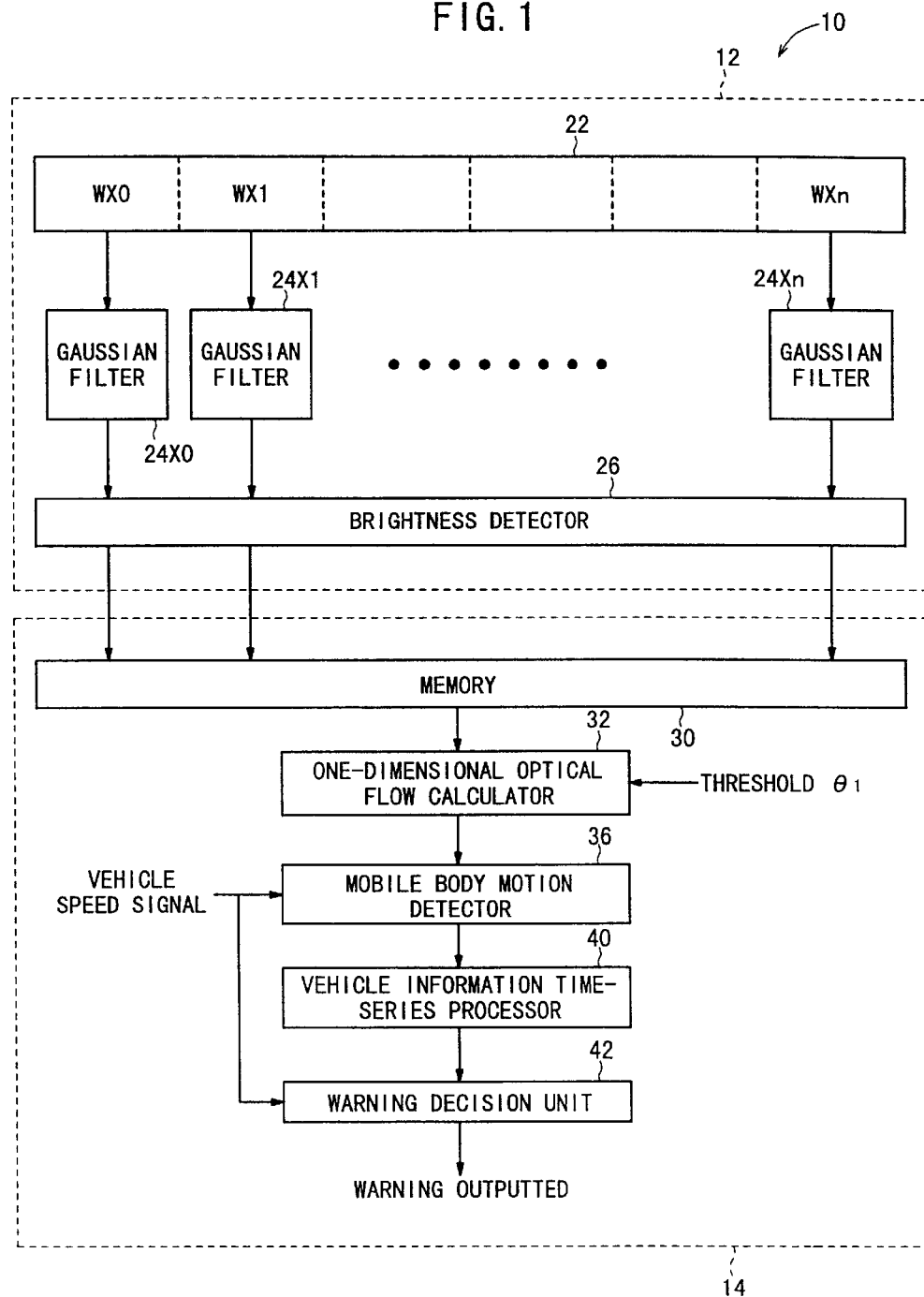
FIG. 1 is a block diagram of a motor vehicle monitoring apparatus according to an embodiment of the present invention.

FIG. 1 shows in block form a motor vehicle monitoring apparatus according to the present invention. As shown in FIG. 1, the motor vehicle monitoring apparatus, generally denoted at 10, comprises a brightness input device 12 and a processor 14 which comprises a memory 30, a one-dimensional optical flow calculator 32, a mobile body motion detector 36, a vehicle information time-series processor 40, and a warning decision unit 42.

The brightness input device 12 has a CCD camera 22 which is mounted near the rear trunk lid of a motor vehicle for imaging an object behind the motor vehicle within a predetermined angle of field. Image information captured by the CCD camera 22 has its imaged area (image area) divided into a plurality of overlapping successive circular areas WX0–WXn (see also FIG. 2), which are supplied respectively through Gaussian filters 24X0–24Xn to a brightness detector 26. Adjacent ones of the circular areas WX0–WXn over-lap each other in order to avoid moving information of the imaged object.

Figure 2:
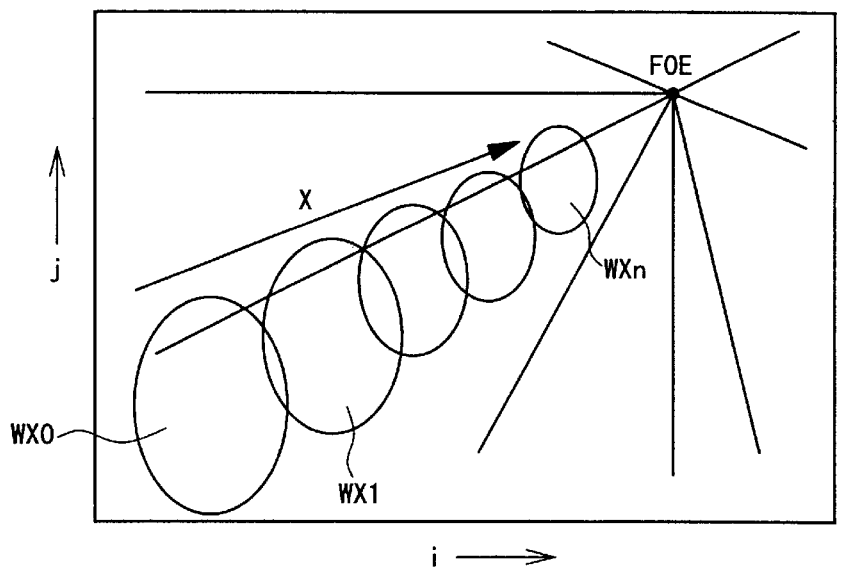
FIG. 2 is a diagram illustrative of a plurality of areas to be imaged by a brightness input device.
Figure 3:
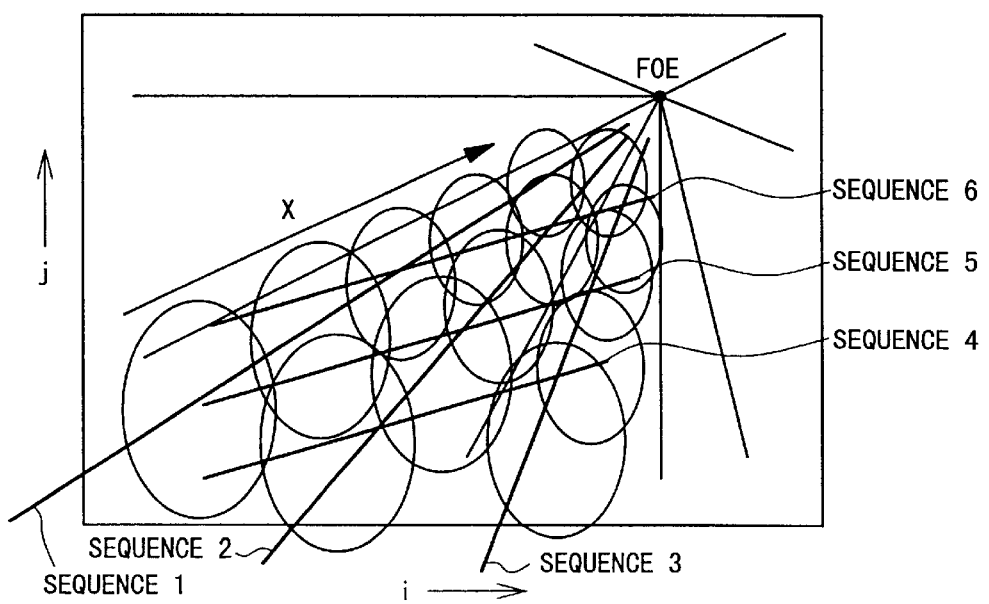
FIG. 3 is a diagram illustrative of a plurality of areas to be imaged by the brightness input device.

As shown in FIG. 2, the overlapping successive circular areas WX0–WXn are divided along an X-axis direction toward a focus of expansion (FOE). Alternatively, as shown in FIG. 3, the overlapping successive circular areas may comprise a plurality of areas in a plurality of sequences, e.g., sequences 1–3, along the X-axis direction toward the FOE, and a plurality of areas in a plurality of sequences, e.g., sequences 4–6, along an axis direction transverse to the X-axis direction toward the FOE.

The brightness input device 12 does not perform a function to grasp information of an object existing behind a motor vehicle which incorporates the motor vehicle monitoring apparatus 10 as image information and process the image information to recognize the object. Rather, the brightness input device 12 recognizes information of an object as a mobile body, e.g., a following motor vehicle running behind the motor vehicle in an attempt to pass the motor vehicle, as brightness information representing a brightness different from other nearby objects and surrounding environments, and supplies the brightness information to the processor 14 in order to calculate a motion of the brightness information in the divided areas within a given visual field as a one-dimensional optical flow of the following motor vehicle.

In order to recognize information of a following motor vehicle running behind the motor vehicle as brightness information representing a brightness different from other nearby objects, according to the present embodiment, the information of a shadow produced on the road by the following motor vehicle is used as information representing a large brightness difference between the following motor vehicle and the road, and the brightness information of the shadow is obtained as the information of the following motor vehicle.

The use of the brightness information of the shadow is based on the following consideration: When the following motor vehicle is running on the road in daylight, brightness information obtained from the shadow produced on the road by the following motor vehicle can easily be detected because it has a much lower level of brightness than the surrounding brightness information on the road. Therefore, such brightness information can be detected as information representing the following motor vehicle, i.e., a mobile body, from the brightness detected by the CCD camera 22. Based on the detected brightness information, a one-dimensional optical flow of the following motor vehicle is calculated for thereby obtaining motor vehicle information without the need for complex image processing.

The brightness information obtained from the shadow is effective particularly when the following motor vehicle runs in daylight. When the following motor vehicle runs at night, brightness information obtained from the headlights or small lamps of the following motor vehicle represents a much higher level of brightness than the surrounding brightness information on the road. Therefore, at night, the brightness information representing the much higher level of brightness is detected as information indicative of the following motor vehicle.

Figure 4:
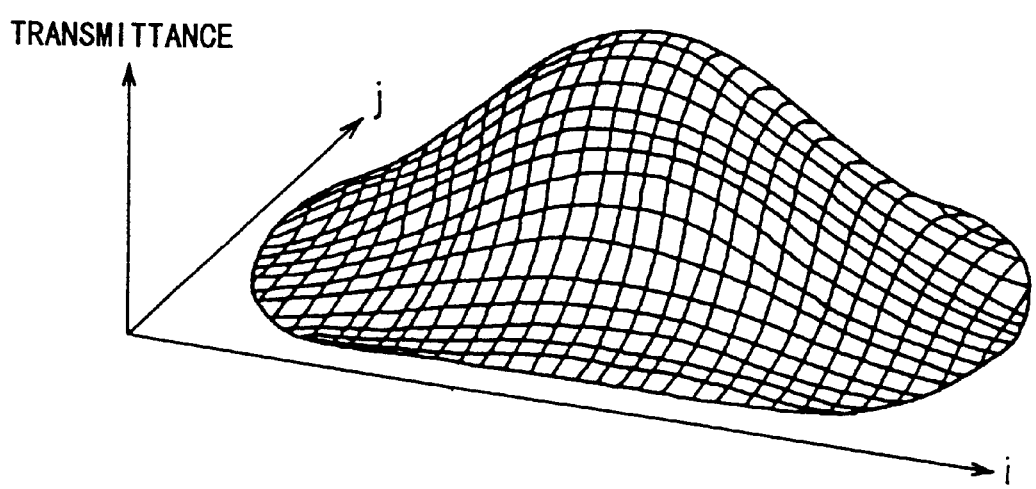
FIG. 4 is a diagram showing the characteristics of a Gaussian filter.

The brightness information detected in the areas WX0–WXn by the CCD camera 22 is detected through the Gaussian filters 24X0–24Xn. Each of the Gaussian filters 24X0–24Xn has such characteristics that it outputs information in a central portion of an area as it is and cuts off or attenuates information in a surrounding portion of the area, as indicated by a curve in FIG. 4 where the area is represented by a two-dimensional plane having an i-axis and a J-axis and a signal transmittance is represented by the vertical axis. Since the Gaussian filters 24X0–24Xn cuts off a portion of input information to produce output information, the amount of output information from the Gaussian filters 24X0–24Xn can be reduced from the amount of input information.

Stated otherwise, using the Gaussian filters 24X0–24Xn, information in central portions of the areas WX0–WXn where the probability of significant information is high is retained, and information in surrounding portions of the areas WX0–WXn where the probability of significant information is low is eliminated or attenuated. Accordingly, the amount of information produced by the Gaussian filters 24X0–24Xn is reduced, and hence the amount of information to be processed by the processor 14 is reduced.

The Gaussian filters 24X0–24Xn may comprise either optical filters or electrical filters. If the Gaussian filters 24X0–24Xn comprise optical filters, then they may have optical lenses arranged such that they transmit brightness information represented by image signals in the respective areas WX0–WXn by the CCD camera 22, in a progressively lower quantity toward the peripheral edges of the areas WX0–WXn. If the Gaussian filters 24X0–24Xn comprise electrical filters, then they may have filter circuits which convert image signals (brightness information) in the respective areas WX0–WXn by the CCD camera 22 into electric signals, and attenuate the electric signals to a progressively lower level toward the peripheral edges of the areas WX0–WXn.

As described above, the visual field is divided into the successive areas WX0–WXn, and brightness information It (i, j) (i, j indicate pixel positions of the CCD camera 22) representing the following motor vehicle, which is detected in the respective areas WX0–WXn by the CCD camera 22, the Gaussian filters 24X0–24Xn, and the brightness detector 26 at each observation time t, is stored in the memory 30 at each observation time t.

The brightness information It (i, j) stored in the memory 30 is then read by the one-dimensional optical flow calculator 32. The processor 14 comprises an ordinary microprocessor, for example, stores an arithmetic and control program (described below) in a ROM (Read-Only Memory) thereof, and executes the arithmetic and control program read from the ROM.

Figure 5:
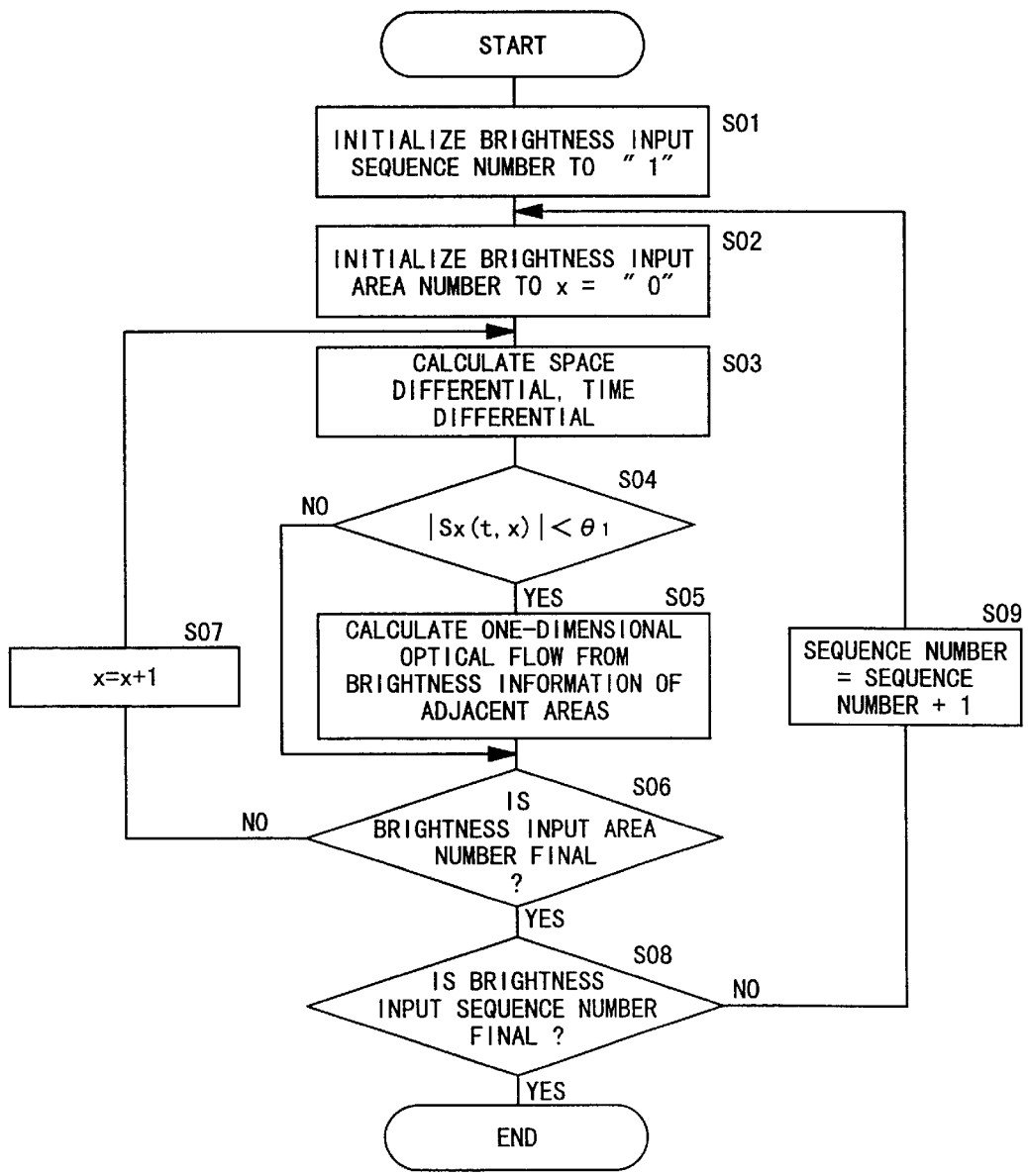
FIG. 5 is a flowchart of a processing sequence of a one-dimensional optical flow calculator in the motor vehicle monitoring apparatus shown in FIG. 1.

Based on the brightness information It (i, j) read from the memory 30, the one-dimensional optical flow calculator 32 calculates a one-dimensional optical flow in each of the areas WX0–WXn according to a processing sequence shown in FIG. 5.

In step S01, the one-dimensional optical flow calculator 32 initializes a sequence number (see FIG. 3) to "1" to select the sequence 1. Then, the one-dimensional optical flow calculator 32 initializes an area number x (brightness input area number) of the sequence 1 to "0" to select the area WX0 in step S02, and thereafter calculates a sum of products according to the equation (1) given below thereby to calculate a signal S (t, x) in an area Wx (representing one of the areas WX0–WXn) at the observation time t.

$$S(t, x) = \sum_{i,j} Wx(i, j) \times It(i, j) \quad (1)$$

where Wx (i, j) represents a coefficient which is 1 if the pixel position (i, j) is included in the area Wx and 0 if the pixel position (i, j) is not included in the area Wx.

Then, the one-dimensional optical flow calculator 32 calculates a space differential Sx(t, x) of the signal S (t, x) and a time differential St(t, x) of the signal S according to the following equations (2), (3):

$$Sx(t, x) = \frac{[S(t, x+1) - S(t, x)] + [S(t+1, x+1) - S(t+1, x)]}{2} \quad (2)$$

$$St(t, x) = \frac{[S(t+1, x) - S(t, x)] + [S(t+1, x+1) - S(t, x+1)]}{2} \quad (3)$$

Then, in step S04, the one-dimensional optical flow calculator 32 compares the absolute value of the space differential Sx(t, x) calculated by the equation (2) with a threshold $\theta_1$.

If the absolute value of the space differential Sx(t, x) is smaller than the threshold $\theta_1$, then it means that a brightness change greater than the threshold $\theta_1$ is not detected in the adjacent area Wx. That is, it indicates that the reliability of the one-dimensional optical flow based on the calculated space differential Sx(t, x) is low, and the calculation of the one-dimensional optical flow and the detection of the motion of the mobile body based on the calculated space differential Sx(t, x) are meaningless.

If the absolute value of the space differential Sx(t, x) is equal to or greater than the threshold $\theta_1$, then it means that a brightness change greater than the threshold $\theta_1$ is detected in the adjacent area Wx. That is, it indicates that since the reliability of the one-dimensional optical flow based on the calculated space differential Sx(t, x) is sufficient, the reliability of the calculation of the one-dimensional optical flow and the detection of the motion of the mobile body based on the calculated space differential Sx(t, x) is high.

Stated otherwise, the one-dimensional optical flow calculator 32 compares the threshold $\theta_1$ and the absolute value of the space differential Sx(t, x) to detect whether there is a change in the motion of the following mobile body or not. If a change is detected in the motion of the following mobile body, then the one-dimensional optical flow calculator 32 calculates a one-dimensional optical flow.

If $|Sx(t, x)| \geq \theta_1$, then the one-dimensional optical flow calculator 32 determines that there is a change in the motion of the following mobile body, and calculates a one-dimensional optical flow V(t, x) of the following mobile body according to the following equation (4) in step S05:

$$V(t, x) = -\frac{St(t, x)}{Sx(t, x)} \quad (4)$$

If the brightness input area number is not final in step S06, then the one-dimensional optical flow calculator 32 sets the brightness input area number x to x=x+1 in step S07. Then, control goes back to step S03, and the one-dimensional optical flow calculator 32 repeats the above processing until the final brightness input area number is reached. If the sequence number is not final in step S08, then the one-dimensional optical flow calculator 32 sets the sequence number to (sequence number+1) in step S09. Thereafter, control goes back to step S02, and the one-dimensional optical flow calculator 32 repeats the above processing until the final sequence number is reached.

Figure 6:
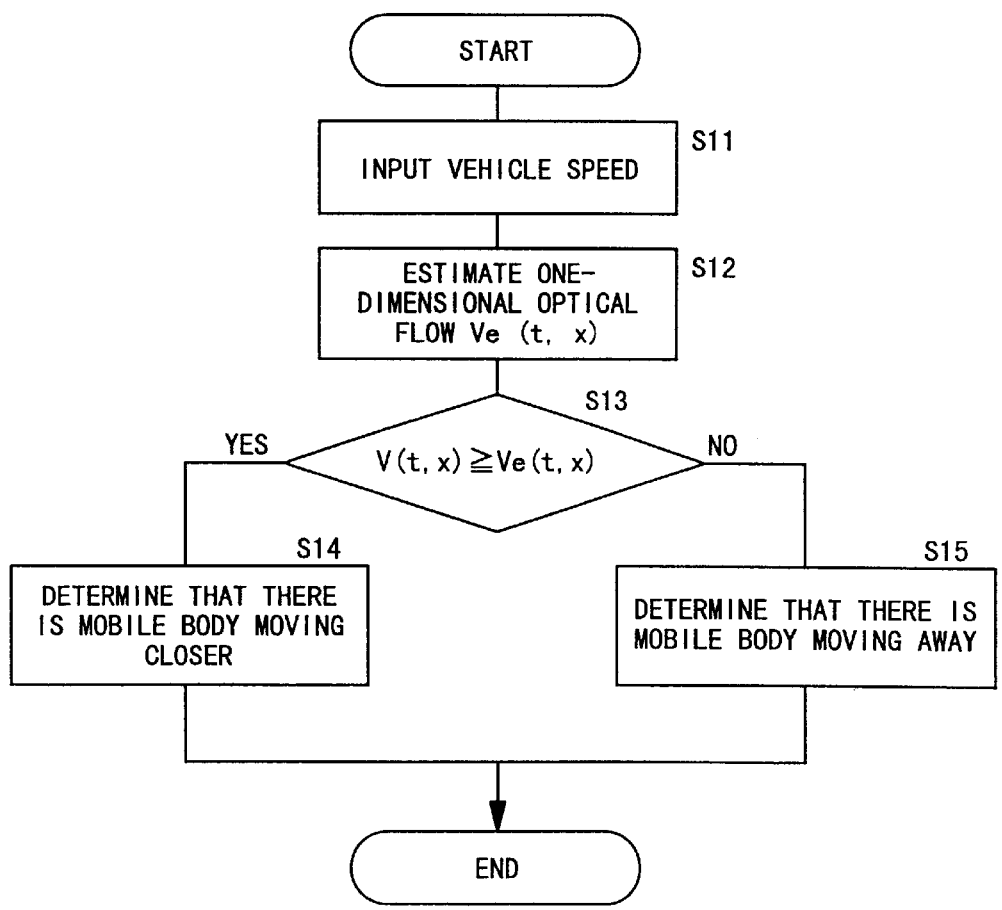
FIG. 6 is a flowchart of a processing sequence of a mobile body motion detector in the motor vehicle monitoring apparatus shown in FIG. 1.

After the one-dimensional optical flow calculator 32 has calculated the one-dimensional optical flow V(t, x) of the mobile body, the mobile body motion detector 36 detects a motion of the mobile body according to a processing sequence shown in FIG. 6.

In FIG. 6, the mobile body motion detector 36 is supplied with a speed signal indicative of the speed of the motor vehicle which incorporates the motor vehicle monitoring apparatus 10 in step S11. Based on the supplied speed signal, the mobile body motion detector 36 calculates, as an estimated value, a one-dimensional optical flow Ve(t, x) of a stationary object, e.g., a white-line pattern (central line or lane line) on the road, in step S12.

Then, the mobile body motion detector 36 compares the one-dimensional optical flow V(t, x) of the mobile body calculated in each area Wx with the one-dimensional optical flow Ve(t, x) of the stationary object. If V(t, x)≧Ve(t, x), then the mobile body motion detector 36 determines that there is a mobile body moving toward the motor vehicle which incorporates the motor vehicle monitoring apparatus 10, i.e., there is a following motor vehicle moving toward the motor vehicle which incorporates the motor vehicle monitoring apparatus 10 in an attempt to pass the motor vehicle in step S14. If V(t, x)<Ve(t, x), then the mobile body motion detector 36 determines that there is a mobile body moving away from the motor vehicle which incorporates the motor vehicle monitoring apparatus 10, i.e., there is a following motor vehicle slower than the motor vehicle which incorporates the motor vehicle monitoring apparatus 10 in step S15.

If V(t, x)≧Ve(t, x), i.e., if there is a following motor vehicle moving toward the motor vehicle which incorporates the motor vehicle monitoring apparatus 10 in an attempt to pass the motor vehicle, then the magnitude of the one-dimensional optical flow V(t, x) of the following motor vehicle represents the magnitude of a relative speed between the following motor vehicle and the motor vehicle which incorporates the motor vehicle monitoring apparatus 10. The greater than the magnitude of the one-dimensional optical flow V(t, x), the higher the speed at which the following motor vehicle moves toward the motor vehicle which incorporates the motor vehicle monitoring apparatus 10.

In the case where the existence of a following motor vehicle is recognized as information representing a change in the brightness information of the following motor vehicle, as described above in the present embodiment, the following motor vehicle detected at a certain detected time may disappear at a next detected time depending on the environment of the road. For example, when the information of the shadow of a motor vehicle is detected as brightness information of the motor vehicle, reflected light from around the motor vehicle may be applied to the shadow of the motor vehicle, possibly eliminating and hence failing to detect the brightness information. In situations where it is difficult to detect only the information from the road, one-dimensional optical flows of stationary objects, including white lines on the road, road light poles, and road signs are also detected due to a relative speed between those stationary objects and the motor vehicle which incorporates the motor vehicle monitoring apparatus 10. Therefore, it is necessary to isolate those one-dimensional optical flows of stationary objects from the information of the following motor vehicle.

In this embodiment, the mobile body motion detector 36 stores time-series information of motions of a mobile body detected from time to time, and the vehicle information time-series processor 40 detects a motor vehicle moving toward the motor vehicle which incorporates the motor vehicle monitoring apparatus 10, based on the continuity of the detection of the mobile body in the continuous flow of time.

Figure 7:
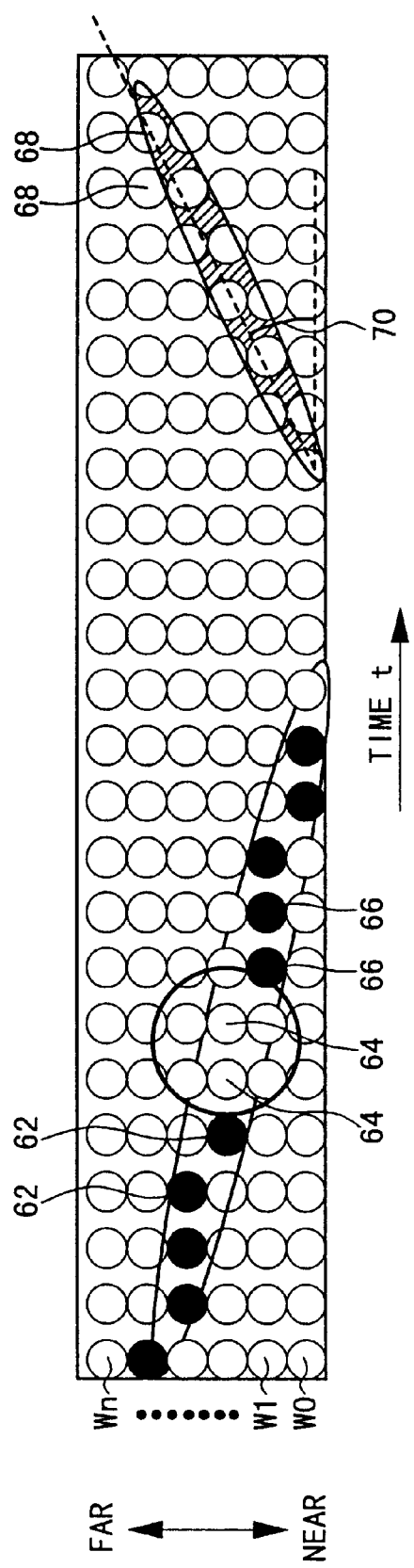
FIG. 7 is a diagram illustrative of the concept of a vehicle information time-series processing process.

FIG. 7 is illustrative of the concept of such a vehicle information time-series processing process. In FIG. 7, the vertical axis represents areas W0–Wn of a certain sequence shown in FIGS. 2 and 3, and the horizontal axis represents the observation time t. The solid dot "●" indicates a point where a one-dimensional optical flow of a mobile body is detected, and the blank dot "○" a point where a one-dimensional optical flow of a mobile body is not detected.

In FIG. 7, a one-dimensional optical flow V(t, x) of a mobile body and a one-dimensional optical flow Ve(t, x) produced by a pattern on the road are compared with each other, and it is determined that there is a following mobile body moving toward the motor vehicle which incorporates the motor vehicle monitoring apparatus 10 in an attempt to pass the latter motor vehicle (V(t, x)≧Ve(t, x)) at the times of points 62. At the times of next points 64, however, reflected light from the environment is applied to the shadow of the following motor vehicle, and no brightness information of the following motor vehicle is obtained, i.e., no mobile body is detected. At the times of next points 66, a following mobile body moving toward the motor vehicle which incorporates the motor vehicle monitoring apparatus 10 is detected again. In this case, the mobile body motion detector 36 stores time-series information of the mobile body at the respective times, and determines that there is a following mobile body moving toward the motor vehicle which incorporates the motor vehicle monitoring apparatus 10 at the times of the points 64, based on the continuity of the stored time-series information of the mobile body detected at the respective times. Accordingly, the motor vehicle monitoring apparatus 10 is capable of monitoring a mobile body or a following motor vehicle with increased reliability and accuracy.

As indicated at points 68, a one-dimensional optical flow is detected from a white line on the road at a relative speed depending on the speed of the motor vehicle which incorporates the motor vehicle monitoring apparatus 10. However, since the detected one-dimensional optical flow is in a direction away from the motor vehicle which incorporates the motor vehicle monitoring apparatus 10 (V(t, x)<Ve(t, x)) and has a constant gradient of 70 corresponding to the motor vehicle which incorporates the motor vehicle monitoring apparatus 10, the detected one-dimensional optical flow can clearly be isolated from the one-dimensional optical flow of the following motor vehicle moving toward the motor vehicle which incorporates the motor vehicle monitoring apparatus 10.

Figure 8:
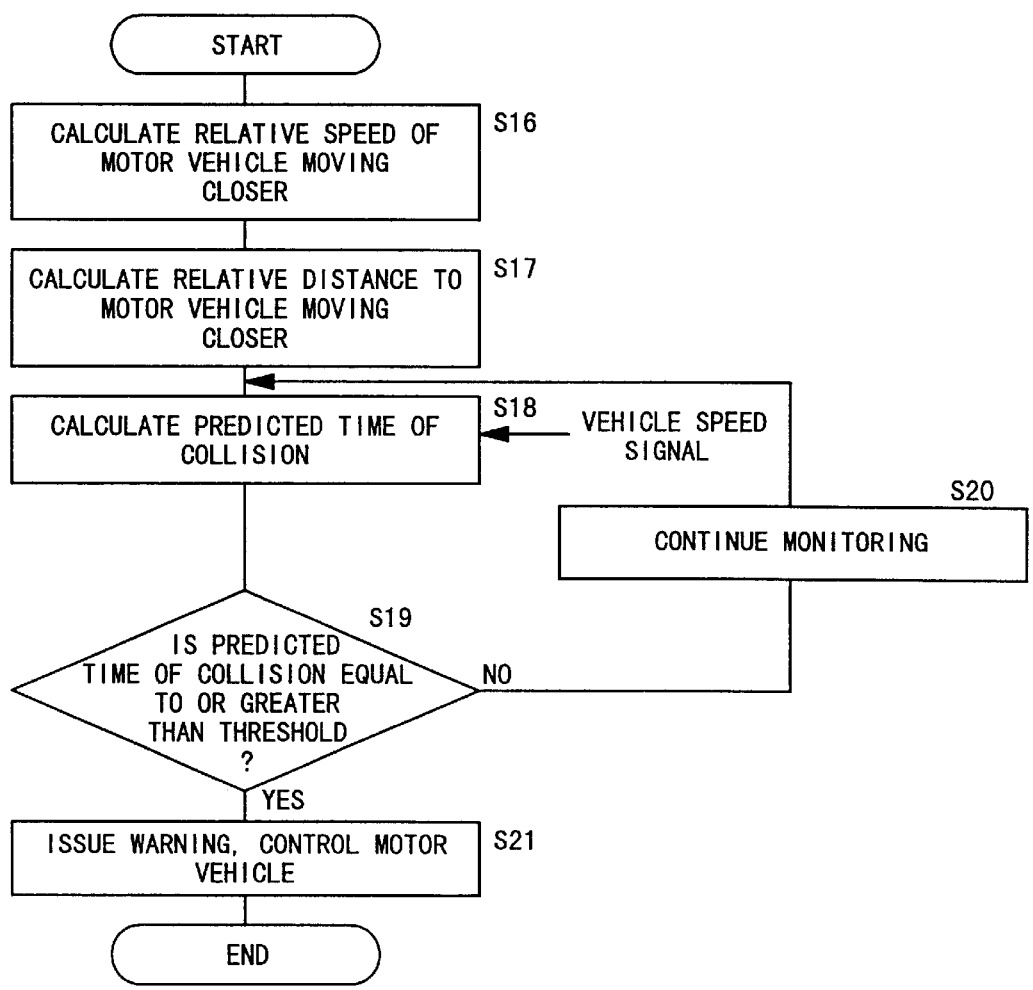
FIG. 8 is a flowchart of a processing sequence of a warning decision unit in the motor vehicle monitoring apparatus shown in FIG. 1.

After the following motor vehicle has been detected as described above, the warning decision unit 42 issues a warning to the driver and controls the motor vehicle which incorporates the motor vehicle monitoring apparatus 10, according to a processing sequence shown in FIG. 8.

Specifically, if a following mobile body moving toward the motor vehicle which Incorporates the motor vehicle monitoring apparatus 10 is detected, the warning decision unit 42 calculates a relative speed of the following motor vehicle with respect to the motor vehicle which incorporates the motor vehicle monitoring apparatus 10 in step S16, and calculates a relative distance between the following motor vehicle and the motor vehicle which incorporates the motor vehicle monitoring apparatus 10 from the position where the one-dimensional optical flow is calculated, in step S17.

From the calculated relative speed and the speed of the motor vehicle which incorporates the motor vehicle monitoring apparatus 10, the warning decision unit 42 calculates a predicted time of collision in step S18. Then, the warning decision unit 42 compares the predicted time of collision with a predetermined threshold in step S19. If the predicted time of collision is greater than the predetermined threshold, then the warning decision unit 42 monitors the following motor vehicle in step S20. If the predicted time of collision is equal to or smaller than the predetermined threshold, then the warning decision unit 42 issues a warning to the driver as by energizing a buzzer or the like to indicate that the following motor vehicle is approaching the motor vehicle which incorporates the motor vehicle monitoring apparatus 10, and, if necessary, controls the motor vehicle which incorporates the motor vehicle monitoring apparatus 10, in step S21.

For example, the warning decision unit 42 controls the motor vehicle which incorporates the motor vehicle monitoring apparatus 10 as follows: When the following motor vehicle in an adjacent lane approaches the motor vehicle which incorporates the motor vehicle monitoring apparatus 10 within a predetermined distance, if the driver of the motor vehicle which incorporates the motor vehicle monitoring apparatus 10 does not notice the following motor vehicle and tries to turn the steering wheel to change lanes, then the warning decision unit 42 issues a control signal to control a steering system of the motor vehicle to prevent the steering wheel from being turned.

Figure 9:
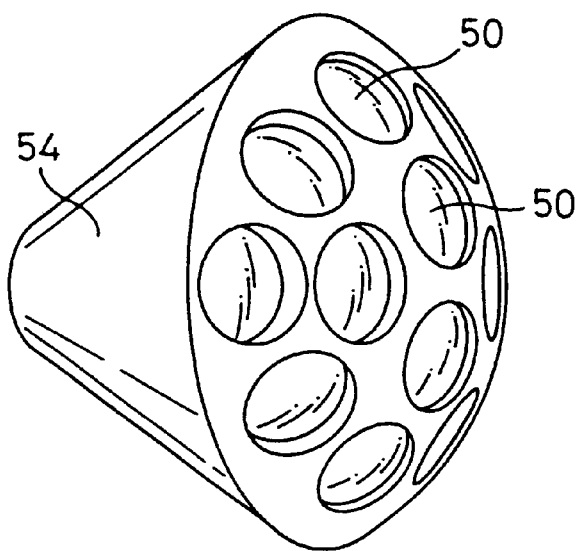
FIG. 9 is a perspective view of a brightness input device according to another embodiment of the present invention.
Figure 10:
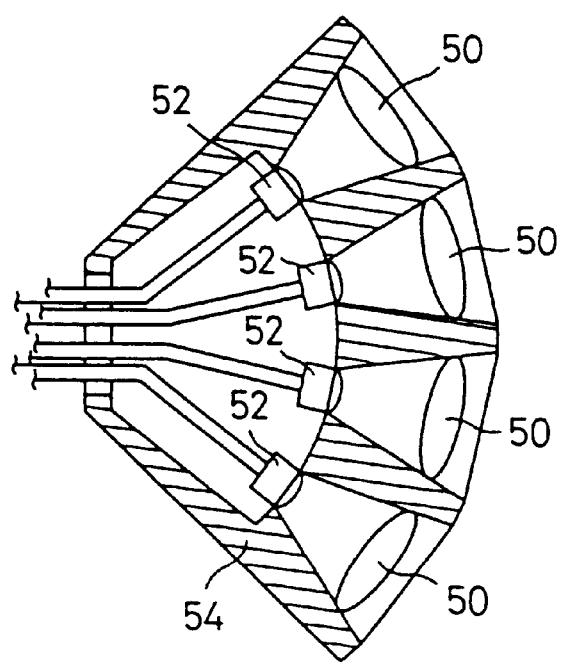
FIG. 10 is a cross-sectional view of the brightness input device shown in FIG. 9.

In the above embodiment, the brightness input device 12 comprises the CCD camera 22. However, as shown in FIGS. 9 and 10, the brightness input device may comprise a plurality of optical lenses 50 oriented in respective successive visual fields and having Gaussian characteristics, a plurality of photodiodes 52 positioned behind and associated respectively with the optical lenses 50, and a housing 54 which accommodates the optical lenses 50 and the photodiodes 52. The housing 54 has a partly spherical surface in which the optical lenses 50 are arranged. Since the optical lenses 50 serve as optical filters with the Gaussian characteristics, the brightness input device 12 shown in FIGS. 9 and 10 can produce a smaller amount of image information to be processed than the CCD camera 22. With the brightness input device shown in FIGS. 9 and 10, it is possible to process 1000 or more frames of image information per second, for example, which is a much higher rate than about 30 frames of image information per second that are possible with the CCD camera 22.

Although certain preferred embodiments of the present invention have been shown and described in detail, it should be understood that various changes and modifications may be made therein without departing from the scope of the appended claims.

What is claimed is:

1. An apparatus for recognizing a mobile body, comprising:
    information extracting means for extracting only brightness information from a plurality of visual areas;
    space differential calculating means for determining a rate of change in space of said brightness information between adjacent ones of said visual areas;
    time differential calculating means for determining a rate of change in time of said brightness information between adjacent ones of said visual areas; and
    mobile body detecting means for detecting a motion of a mobile body between the visual areas from said rate of change in space of said brightness information and said rate of change in time of said brightness information.

2. An apparatus according to claim 1, wherein said filters comprise Gaussian filter circuits for attenuating the brightness information in peripheral portions of said visual areas to a level lower than the brightness information in central portions of said visual areas.

3. An apparatus according to claim 2, wherein said filters comprise optical lenses having a lower transmittance for the brightness information in peripheral portions of said visual areas than in central portions of said visual areas.

4. An apparatus according to claim 1, wherein said information extracting means comprises CCD camera.

5. An apparatus according to claim 1, wherein said information extracting means comprises a plurality of photodiodes associated with said visual areas, respectively.

6. An apparatus according to claim 1, wherein said mobile body detecting means comprises means for stopping detecting the motion of the mobile body if an absolute value of said rate of change in space of said brightness information as determined by said space differential calculating means is smaller than a predetermined reference value.

7. An apparatus according to claim 1, wherein said mobile body detecting means comprises means for determining a one-dimensional optical flow V representing the motion of the mobile body according to the equation:

$$V = -St/Sx$$

where St represents said rate of change in time of said brightness information, and Sx represents said rate of change in space of said brightness information.

8. An apparatus according to claim 1, wherein said mobile body detecting means comprises means for storing time-series information of the mobile body at respective times, and detecting the motion of said mobile body based on the continuity of the stored time-series information at the respective times.

9. An apparatus mounted on a motor vehicle for monitoring another motor vehicle which is moving relatively to the motor vehicle, comprising:
    information extracting means for extracting only brightness information from a plurality of visual areas;
    space differential calculating means for determining a rate of change in space of said brightness information between adjacent ones of said visual areas;
    time differential calculating means for determining a rate of change in time of said brightness information between adjacent ones of said visual areas; and
    other motor vehicle detecting means for detecting a motion of said other motor vehicle between the visual areas from said rate of change in space of said brightness information and said rate of change in time of said brightness information.

10. An apparatus according to claim 9, wherein said other motor vehicle detecting means comprises means for calculating a one-dimensional optical flow representing the motion of the mobile body from said rate of change in time of said brightness information and said rate of change in space of said brightness information, and comparing the calculated one-dimensional optical flow with a one-dimensional optical flow of a mobile body other than said other motor vehicle, which is estimated based on a speed of said motor vehicle, thereby to detect said other motor vehicle which moves relatively to said motor vehicle.

11. An apparatus according to claim 10, wherein said other motor vehicle detecting means comprises means for determining said other motor vehicle as moving toward said motor vehicle or said other motor vehicle as moving away from said motor vehicle, from a result of comparison between the one-dimensional optical flows.

12. An apparatus according to claim 9, wherein said other motor vehicle detecting means comprises means for storing time-series information of the other motor vehicle at respective times, and detecting the motion of said other motor vehicle based on the continuity of the stored time-series information at the respective times.

13. An apparatus according to claim 1, wherein said information extracting means comprises a brightness input device which sets said plurality of visual areas in an image, and a sum of said visual areas is less than the entire area of the image.

14. An apparatus according to claim 9, wherein said information extracting means comprises a brightness input device which sets said plurality of visual areas in an image, and a sum of said visual areas is less than the entire area of the image.

15. An apparatus for recognizing a mobile body, comprising:
    an input device which sets a plurality of visual areas in an image and extracts only brightness information from said visual areas;
    a space differential calculator which determines a rate of change in space of the extracted brightness information between adjacent ones of said visual areas;

a time differential calculator which determines a rate of change in time of the extracted brightness information between adjacent ones of said visual areas; and a mobile body detector which detects motion of a mobile body between the visual areas based on the calculated rate of change in space and rate of change in time of said space differential calculator and time differential calculator.

16. An apparatus according to claim 15, wherein said mobile body detector stops detecting motion of the mobile body if an absolute value of the rate of change by space of the extracted brightness information as determined by said space differential calculator is less than a predetermined reference value.

17. An apparatus according to claim 15, wherein said apparatus is adapted to be mounted on a motor vehicle, said mobile body detector calculates a one dimensional optical flow representing the motion of the mobile body from the calculated rate of change in space and rate of change in time of said space differential calculator and time differential calculator, and compares said one-dimensional optical flow with a one-dimensional optical flow of a different mobile body estimated based on a speed of the motor vehicle, to detect the mobile body which moves relative to the motor vehicle.

18. An apparatus according to claim 15, wherein a sum of said visual areas is less than the entire area of the image.

* * * * *

UNITED STATES PATENT AND TRADEMARK OFFICE
CERTIFICATE OF CORRECTION

PATENT NO.      : 6,636,257 B1
DATED           : October 21, 2003
INVENTOR(S)     : Ichiro Harada and Naoya Ohta It is certified that error appears in the above-identified patent and that said Letters Patent is hereby corrected as shown below:

Column 1,
Line 25, change "signal from the CCD sensor is processed to recognize" to -- signal from the CCD sensor is processed to recognize, for example, --.
Line 29, change "It is assumed, for example, that a motor vehicle is" to -- It is assumed, for example, that when a motor vehicle is --.
Line 60, change "captured image information, and issues a warning to the" to -- captured image information, and if necessary issues a warning to the --.

Column 2,
Line 27, change "attempt to pass the automobile and then give a suitable" to -- attempt to pass the automobile, and then to give a suitable --.
Line 45, change "holding information obtained from a mobile body to a" to -- holding information obtained relative to a mobile body to a --.
Line 52, change "holding information obtained from another motor vehicle" to -- holding information obtained relative to another motor vehicle --.
Between lines 56 and 57, insert
-- According to one aspect of the present invention there is provided an apparatus for recognizing a mobile body, which apparatus comprises: brightness information extracting means for extracting brightness information from a plurality of visual areas; space differential calculating means from determining a rate of change in space of the brightness information between adjacent ones of the visual areas; time differential calculating means for determining a rate of change in time of the brightness information between adjacent ones of the visual areas; and mobile body detecting means for detecting a motion of a mobile body between the visual areas from the rate of change in space of the brightness information and the rate of change in time of the brightness information.
    Preferably, the visual areas comprise circular areas, with adjacent ones of the visual areas overlapping each other, and the brightness information extracting means comprises a plurality of filters having Gaussian characteristics for extracting the brightness information from the overlapping circular areas.
    According to another aspect of the present invention there is provided an apparatus mounted on a motor vehicle for monitoring another motor vehicle which is moving relatively to the motor vehicle, which apparatus comprises: brightness information extracting means for extracting brightness information from a plurality of visual areas; space differential calculating means for determining a rate of change in space of the brightness information between adjacent ones of the visual areas; time differential calculating means for determining a rate of change in time of the brightness information between adjacent ones of the visual areas; and other motor vehicle detecting means for detecting a motion of the other motor vehicle between the visual areas from the rate of change in space of the brightness information and the rate of change in time of the brightness information. --

UNITED STATES PATENT AND TRADEMARK OFFICE
CERTIFICATE OF CORRECTION

PATENT NO. : 6,636,257 B1
DATED : October 21, 2003
INVENTOR(S) : Ichiro Harada and Naoya Ohta It is certified that error appears in the above-identified patent and that said Letters Patent is hereby corrected as shown below:

Column 3,
Line 49, change "over-lap each other in order to avoid moving information of"
to -- overlap each other in order to avoid moving information of --.

Column 4,
Line 51, change "J-axis and a signal transmittance is represented by the" to -- j-axis and a signal transmittance is represented by the --.
Line 52, change "vertical axis. Since the Gaussian filters 24X0 - 24Xn cuts off"
to -- vertical axis. Since the Gaussian filters 24X0 - 24Xn cut off --.

Column 7,
Line 15, change "greater than the magnitude of the one-dimensional optical"
to -- greater the magnitude of the one-dimensional optical --.

Column 8,
Line 33, change "the motor vehicle which Incorporates the motor vehicle"
to -- the motor vehicle which incorporates the motor vehicle --.

Column 9,
Line 41, change "rate of change in time of said brightness information."
to -- rate of change in time of said brightness information;
    said visual areas comprising circular areas, with adjacent ones of the visual areas overlapping each other, and said information extracting means comprises a plurality of filters having Gaussian characteristics for extracting the brightness information from the overlapping circular visual areas. --.
Line 47, change "3. An apparatus according to claim 2, wherein said filters" to -- 3. An apparatus according to claim 1, wherein said filters --.
Line 52, change "information extracting means comprises CCD camera."
to -- information extracting means comprises a CCD camera. --.

Column 10,
Line 7, change "and detecting the motion of said mobile body based on the" to -- and detecting the motion of said mobile body based on --.
Line 26, change "brightness information." to -- brightness information;
    said visual areas comprising circular areas, with adjacent ones of the visual areas overlapping each other, and said information extracting means comprises a plurality of filters having Gaussian characteristics for extracting brightness information from the overlapping circular visual areas. --.
Line 30, change "motion of the mobile body from said rate of change in time"
to -- motion of the other motor vehicle from said rate of change in time --.

UNITED STATES PATENT AND TRADEMARK OFFICE
CERTIFICATE OF CORRECTION

PATENT NO. : 6,636,257 B1
DATED : October 21, 2003
INVENTOR(S) : Ichiro Harada and Naoya Ohta It is certified that error appears in the above-identified patent and that said Letters Patent is hereby corrected as shown below:

Column 10 (cont'd),
Line 41, change "motor vehicle or said other motor vehicle as moving away" to -- motor vehicle or as moving away --.
Line 48, change "vehicle based on the continuity of the store time-series" to -- vehicle based on continuity of the stored time-series --.

Column 11,
Line 8, change "calculator." to -- calculator;
    said visual areas comprising circular areas, with adjacent ones of said visual areas overlapping each other;
    said input device comprises a plurality of filters having Gaussian characteristics for extracting the brightness information from the overlapping circular visual areas. --.
Line 11, change "body if an absolute value of the rate of change by space of" to -- body if an absolute value of the rate of change in space of --.

Column 12,
Line 3, change "mobile body detector calculates a one dimensional optical" to -- mobile body detector calculates a one-dimensional optical --.

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,636,257 B1 |
| APPLICATION NO. | : 09/430746 |
| DATED | : October 21, 2003 |
| INVENTOR(S) | : Ichiro Harada and Naoya Ohta |

It is certified that error appears in the above-identified patent and that said Letters Patent is hereby corrected as shown below:

Column 1,
Line 25, change "signal from the CCD sensor is processed to recognize" to -- signal from the CCD sensor is processed to recognize, for example, --.
Line 29, change "It is assumed, for example, that a motor vehicle is" to -- It is assumed, for example, that when a motor vehicle is --.
Line 60, change "captured image information, and issues a warning to the" to -- captured image information, and if necessary issues a warning to the --.

Column 2,
Line 27, change "attempt to pass the automobile and then give a suitable" to -- attempt to pass the automobile, and then to give a suitable --.
Line 45, change "holding information obtained from a mobile body to a" to -- holding information obtained relative to a mobile body to a --.
Line 52, change "holding information obtained from another motor vehicle" to -- holding information obtained relative to another motor vehicle --.
Between lines 56 and 57, insert
--  According to one aspect of the present invention there is provided an apparatus for recognizing a mobile body, which apparatus comprises: brightness information extracting means for extracting brightness information from a plurality of visual areas; space differential calculating means for determining a rate of change in space of the brightness information between adjacent ones of the visual areas; time differential calculating means for determining a rate of change in time of the brightness information between adjacent ones of the visual areas; and mobile body detecting means for detecting a motion of a mobile body between the visual areas from the rate of change in space of the brightness information and the rate of change in time of the brightness information.

Preferably, the visual areas comprise circular areas, with adjacent ones of the visual areas overlapping each other, and the brightness information extracting means comprises a plurality of filters having Gaussian characteristics for extracting the brightness information from the overlapping circular areas.

According to another aspect of the present invention there is provided an apparatus mounted on a motor vehicle for monitoring another motor vehicle which is moving relatively to the motor vehicle, which apparatus comprises: brightness information extracting means for extracting brightness information from a plurality of visual areas; space differential calculating means for determining a rate of change in space of the brightness information between adjacent ones of the visual areas; time differential calculating means for determining a rate of change in time of the brightness information between adjacent ones of the visual areas; and other motor vehicle detecting means for detecting a motion of the other motor vehicle between the visual areas from the rate of change in space of the brightness information and the rate of change in time of the brightness information. --.

UNITED STATES PATENT AND TRADEMARK OFFICE
CERTIFICATE OF CORRECTION

PATENT NO. : 6,636,257 B1
APPLICATION NO. : 09/430746
DATED : October 21, 2003
INVENTOR(S) : Ichiro Harada and Naoya Ohta It is certified that error appears in the above-identified patent and that said Letters Patent is hereby corrected as shown below:

Column 3,
Line 49, change "over-lap each other in order to avoid moving information of" to -- overlap each other in order to avoid moving information of --.

Column 4,
Line 51, change "J-axis and a signal transmittance is represented by the" to -- j-axis and a signal transmittance is represented by the --.
Line 52, change "vertical axis. Since the Gaussian filters 24X0 - 24Xn cuts off" to -- vertical axis. Since the Gaussian filters 24X0 - 24Xn cut off --.

Column 7,
Line 15, change "greater than the magnitude of the one-dimensional optical" to -- greater the magnitude of the one-dimensional optical --.

Column 8,
Line 33, change "the motor vehicle which Incorporates the motor vehicle" to -- the motor vehicle which incorporates the motor vehicle --.

Column 9,
Line 41, change "rate of change in time of said brightness information." to -- rate of change in time of said brightness information;
    said visual areas comprising circular areas, with adjacent ones of the visual areas overlapping each other, and said information extracting means comprises a plurality of filters having Gaussian characteristics for extracting the brightness information from the overlapping circular visual areas. --.
Line 47, change "3. An apparatus according to claim 2, wherein said filters" to -- 3. An apparatus according to claim 1, wherein said filters --.
Line 52, change "information extracting means comprises CCD camera." to -- information extracting means comprises a CCD camera. --.

Column 10,
Line 7, change "and detecting the motion of said mobile body based on the" to -- and detecting the motion of said mobile body based on --.
Line 26, change "brightness information." to -- brightness information;
    said visual areas comprising circular areas, with adjacent ones of the visual areas overlapping each other, and said information extracting means comprises a plurality of filters having Gaussian characteristics for extracting the brightness information from the overlapping circular visual areas. --.
Line 30, change "motion of the mobile body from said rate of change in time" to -- motion of the other motor vehicle from said rate of change in time --.

UNITED STATES PATENT AND TRADEMARK OFFICE
CERTIFICATE OF CORRECTION

PATENT NO. : 6,636,257 B1
APPLICATION NO. : 09/430746
DATED : October 21, 2003
INVENTOR(S) : Ichiro Harada and Naoya Ohta It is certified that error appears in the above-identified patent and that said Letters Patent is hereby corrected as shown below:

Column 10 (cont'd),
Line 41, change "motor vehicle or said other motor vehicle as moving away"
to -- motor vehicle or as moving away --.
Line 48, change "vehicle based on the continuity of the stored time-series"
to -- vehicle based on continuity of the stored time-series --.

Column 11,
Line 8, change "calculator." to -- calculator;
    said visual areas comprising circular areas, with adjacent ones of said visual areas overlapping each other;
    said input device comprises a plurality of filters having Gaussian characteristics for extracting the brightness information from the overlapping circular visual areas. --.
Line 11, change "body if an absolute value of the rate of change by space of"
to -- body if an absolute value of the rate of change in space of --.

Column 12,
Line 3, change "mobile body detector calculates a one dimensional optical" to -- mobile body detector calculates a one-dimensional optical --.

This certificate supersedes Certificate of Correction issued September 14, 2004.

Signed and Sealed this

Nineteenth Day of September, 2006

JON W. DUDAS
*Director of the United States Patent and Trademark Office*